United States Patent [19]

Hasegawa et al.

[11] Patent Number: 4,476,830
[45] Date of Patent: Oct. 16, 1984

[54] FUEL INJECTION CONTROL METHOD FOR A MULTI-CYLINDER INTERNAL COMBUSTION ENGINE, HAVING A FAIL SAFE FUNCTION FOR ABNORMALITY IN CYLINDER-DISCRIMINATING MEANS

[75] Inventors: Shumpei Hasegawa, Niiza; Shigeo Umesaki, Saitama, both of Japan

[73] Assignee: Honda Giken Kogyo Kabushiki Kaisha, Tokyo, Japan

[21] Appl. No.: 521,246

[22] Filed: Aug. 8, 1983

[30] Foreign Application Priority Data

Aug. 13, 1982 [JP] Japan .............................. 57-140763

[51] Int. Cl.³ .............................................. F02D 17/00
[52] U.S. Cl. .................................... 123/479; 123/472; 123/198 D
[58] Field of Search .................... 123/472, 479, 198 D

[56] References Cited

U.S. PATENT DOCUMENTS

| | | | |
|---|---|---|---|
| 3,834,361 | 9/1974 | Keely .................................... | 123/479 |
| 4,243,009 | 1/1981 | Staerzl .................................. | 123/479 |
| 4,245,315 | 1/1981 | Barman et al. ....................... | 123/479 |
| 4,310,889 | 1/1982 | Iwai et al. ............................. | 123/479 |
| 4,312,315 | 1/1982 | Takase .................................. | 123/479 |
| 4,366,794 | 1/1983 | Hachiga et al. ...................... | 123/479 |
| 4,370,962 | 2/1983 | Hosaka ................................. | 123/479 |
| 4,393,842 | 7/1983 | Otsuka et al. ........................ | 123/479 |
| 4,409,929 | 10/1983 | Susaki et al. ......................... | 123/479 |
| 4,414,949 | 11/1983 | Hönig et al. .......................... | 123/479 |
| 4,414,950 | 11/1983 | Otsuka et al. ........................ | 123/479 |

Primary Examiner—Raymond A. Nelli
Attorney, Agent, or Firm—Lyon & Lyon

[57] ABSTRACT

A fuel injection control method for injecting fuel into a plurality of cylinders of an internal combustion engine in predetermined sequence starting from a fuel injection into a particular one of the cylinders, in synchronism with generation of pulses from crank angle position-detecting means indicative of predetermined crank angle positions of the engine, wherein when one of the cylinders which corresponds to a first pulse from the crank angle position-detecting means generated immediately after generation of a pulse from cylinder-discriminating means indicative of the above particular cylinder is other from the particular cylinder, the sequence of fuel injections into the cylinders is changed so as to effect a first fuel injection into the above particular cylinder immediately after the generation of the above pulse from the cylinder-discriminating means and then effect fuel injections into the other cylinders in the above predetermined sequence. The method is adapted to perform a fail safe function in the event of occurrence of an abnormality in the cylinder-discriminating means. The number of times of the above changing of the fuel injection sequence is counted up to a predetermined value, the cylinder-discriminating means is regarded as abnormal. Then, injection of fuel into the cylinders is effected in the above predetermined sequence in synchronism with pulses from the crank angle position-detecting means alone, irrespective of generation of subsequent pulses from the cylinder-discriminating means.

6 Claims, 5 Drawing Figures

FUEL INJECTION CONTROL METHOD FOR A MULTI-CYLINDER INTERNAL COMBUSTION ENGINE, HAVING A FAIL SAFE FUNCTION FOR ABNORMALITY IN CYLINDER-DISCRIMINATING MEANS

BACKGROUND OF THE INVENTION

This invention relates to a fuel injection control method for supplying fuel through injection to a plurality of cylinders of an internal combustion engine, and more particularly to a method of this kind, which is adapted to perform a fail safe function in the event of occurrence of an abnormality in cylinder-discriminating means which determines the sequence of injections of fuel into the cylinders of the engine.

Among fuel supply control methods for electronically controlling the valve opening period of a fuel metering device of an internal combustion engine, for control of the quantity of fuel being supplied to the engine, a method has been proposed, e.g. by the assignee of the present application in Japanese Provisional patent publication (Kokai) No. 57-137633, which is adapted to first determine a basic value of the above valve opening period, i.e. the fuel supply quantity, as a function of engine rpm and intake pipe absolute pressure and then correcting the basic value thus determined by adding to and/or multiplying same by constants and/or coefficients being functions of parameters indicative of operating conditions of the engine such as engine coolant temperature, throttle valve opening, exhaust gas ingredient concentration (oxygen concentration), etc., while at the same time determining the timing of fuel injection into individual ones of the engine cylinders, from pulses of a crank angle position signal generated at predetermined crank angle positions of pistons within the individual engine cylinders, as well as from pulses of a cylinder-discriminating signal indicative of a predetermined crank angle position of a piston within a particular one of the engine cylinders, and driving fuel injection valves of the fuel metering device in accordance with the corrected fuel supply quantity and the determined fuel injection timing.

According to this control method, fuel is injected into a particular one of the engine cylinders in synchronism with a pulse of the crank angle position signal generated immediately after generation of each pulse of the cylinder-discriminating signal, and thereafter fuel is injected into the other engine cylinders in predetermined sequence in synchronism with subsequent pulses of the crank angle position signal.

In the same control method, due to a noise in cylinder-discriminating means for generating the cylinder-discriminating signal or omission of a pulse of the cylinder-discriminating signal as caused by malfunction of the cylinder-discriminating means, it can happen that an engine cylinder which corresponds to a first pulse of the crank angle position signal generated immediately after generation of a pulse of the cylinder-discriminating signal is different from the above particular engine cylinder. In such event, the sequence of fuel injections into the engine cylinders is changed so as to effect a first fuel injection into the above particular cylinder immediately after the generation of the above pulse from the cylinder-discriminating means and then effect fuel injections into the other cylinders in the above predetermined sequence.

However, if in the event of occurrence of a fault in the cylinder-discriminating means many abnormal pulses of the cylinder-discriminating signal occur, the frequency of the above changing of the fuel injection sequence increases, resulting in the phenomenon that some cylinders are twice supplied with fuel or two times as much as a required fuel quantity during one cycle of the engine, whereas some other cylinders are not supplied with fuel at all during the same cycle of the engine, which impedes smooth operation of the engine, greatly deteriorating the driveability of the engine.

SUMMARY OF THE INVENTION

It is the object of the invention to provide a fuel injection control method for a multi-cylinder internal combustion engine, which is adapted to perform a fail safe function so as to avoid heavy deterioration of the driveability of the engine in the event of occurrence of an abnormality in the cylinder-discriminating means, thereby at least ensuring continued operation of the engine.

According to the invention, there is provided a method for controlling the injection of fuel into an internal combustion engine having a plurality of cylinders, crank angle position-detecting means for detecting predetermined positions of pistons within respective ones of the cylinders and generating pulses as a first signal indicative of detected predetermined positions of the pistons, and cylinder-discriminating means adapted to generate a pulse as a second signal each time the crankshaft of the engine rotates through a predetermined angle with respect to a predetermined position of a piston within a particular one of the cylinders, wherein fuel is injected into the cylinders of the engine in predetermined sequence starting from a fuel injection into the above particular cylinder, in synchronism with pulses successively generated from the above crank angle position-detecting means immediately after generation of each pulse of the above cylinder-discriminating means, the sequence of fuel injections into the cylinders being changed so as to first effect a fuel injection into the above particular cylinder immediately after generation of a pulse of the second signal and thereafter effect fuel injections into the other cylinders in the above predetermined sequence, when one of the cylinders which corresponds to a first pulse of the first signal generated immediately after generation of the above pulse of the second signal is other than the particular cylinder.

The method according to the invention is adapted to perform a fail safe function in the event of occurrence of an abnormality in the cylinder-discriminating means, which comprises the following steps: (1) counting the number of times of the above changing of the sequence of fuel injections and comparing the counted number with a predetermined number; (2) regarding the cylinder-discriminating means as abnormal when the counted number reaches the predetermined number; and (3) effecting fuel injections into the cylinders in the above predetermined sequence in synchronism with pulses of the first signal alone, irrespective of generation of subsequent pulses of the second signal, when the cylinder-discriminating means is regarded as abnormal in the step (2).

Preferably, in the step (2) the cylinder-discriminating means is regarded as abnormal, when the number of times of changing of the fuel injection sequence counted in the step (1) reaches the above predetermined number within a period of time from closing of the ignition switch of the engine to opening thereof or within a predetermined period of time which is previously set.

Further preferably, the counting of the number of times of changing fuel injection sequence of the step (1) is effected only when the rotational speed of the engine exceeds a predetermined value.

The manner of fuel injection into the engine cylinders according to the method of the invention includes either of the following manners: (a) injecting fuel into the cylinders one after another in predetermined sequence starting from a fuel injection into the aforementioned particular cylinder, in synchronism with pulses of the first signal successively generated from the crank angle position-detecting means; and (b) dividing the cylinders into a plurality of groups, and successively injecting fuel into the individual groups in predetermined sequence starting from a fuel injection into one of the groups which includes the above particular cylinder, in synchronism with generation of the first signal.

The above and other objects, features and advantages of the invention will be more apparent from the ensuing detailed description taken in conjunction with the accompanying drawings.

DETAILED DESCRIPTION

The method according to the invention will now be described in detail with reference to the drawings.

Figure 1:
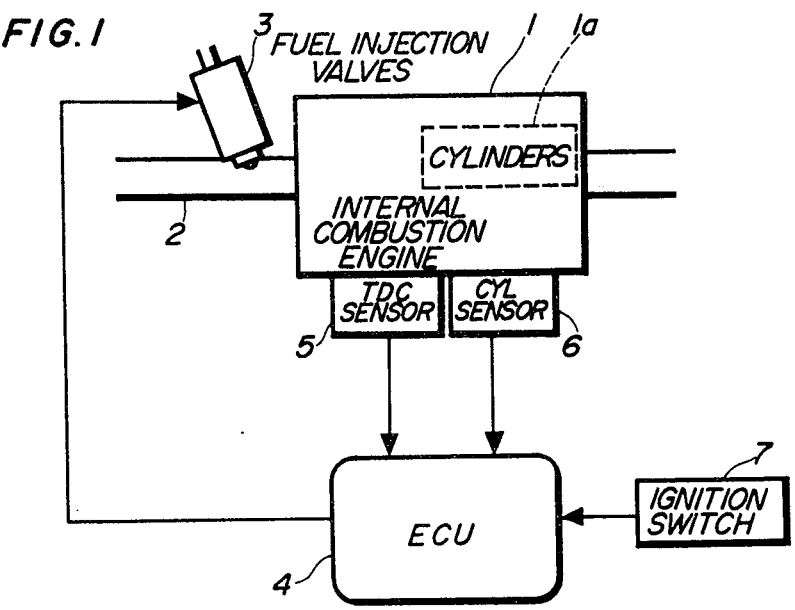
FIG. 1 is a block diagram of the arrangement of a fuel supply control system to which is applied the method according to the invention.
Figure 2:
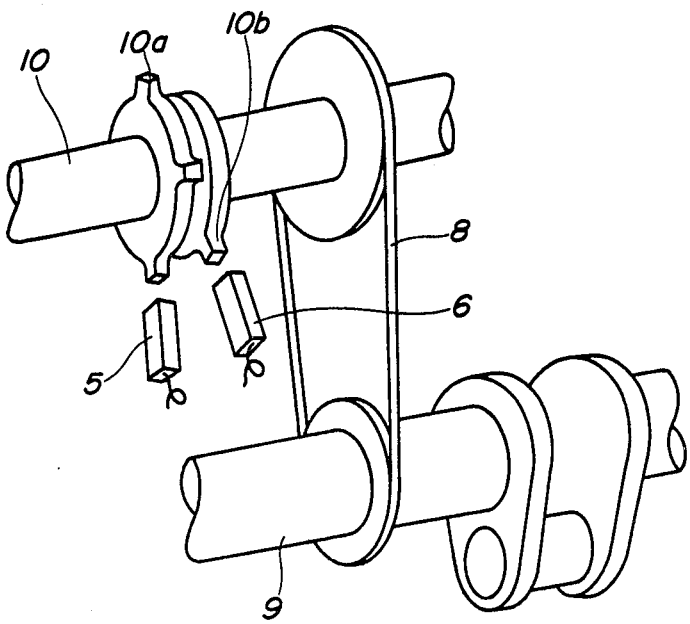
FIG. 2 is a schematic perspective view of crank angle position-detecting means (TDC sensor) and cylinder-discriminating means (CYL sensor), both appearing in FIG. 1.

Referring first to FIG. 1, there is schematically illustrated the arrangement of a fuel supply control system to which is applied the method according to the invention. Reference numeral 1 designates an internal combustion engine which is a multi-cylinder type, for instance, provided with four cylinders 1a, to which is connected an intake manifold 2. Fuel injection valves 3 are arranged in the divergent portions of the intake manifold 2 at locations slightly upstream of intake valves, not shown, for injecting fuel into respective ones of the cylinders 1a. The fuel injection valves 3 are connected to a fuel pump, not shown, and also electrically connected to an electronic control unit (hereinafter called "the ECU") 4 to have their valve opening periods controlled by driving signals generated from the ECU 4. A crank angle position sensor (hereinafter called "the TDC sensor") 5 and a cylinder-discriminating sensor (hereinafter called "the CYL sensor") 6 are electrically connected to the ECU 4 for supplying their output signals thereto. As shown in FIG. 2, these sensors 5, 6 are each composed of electromagnetic pickups arranged, respectively, in facing relation to four protuberances 10a corresponding in number to the cylinders 1a and a single protuberance 10b, formed integrally on respective magnetic discs secured on a camshaft 10 of the engine 1, which is arranged to be rotatively driven by a crankshaft 9 of the same engine with a reduction ratio of 1:2, via a timing belt 8. The TDC sensor 5 is adapted to generate a pulse indicative of a predetermined position of a piston in each of different cylinders 1a of the engine relative to a top dead center of the piston, that is, one pulse at a particular crank angle each time the engine crankshaft 9 rotates through 180 degrees, while the CYL sensor 6 is adapted to generate one pulse each time the crankshaft of the engine rotates through a predetermined angle with respect to a predetermined position of a piston in a particular cylinder. The above pulses generated by the sensors 5, 6 are supplied to the ECU 4.

Further connected to the ECU 4 is an ignition switch 7 for turning on and off an ignition device, not shown, provided in the engine, and supplying a signal indicative of on-off positions thereof to the ECU 4.

Figure 3:
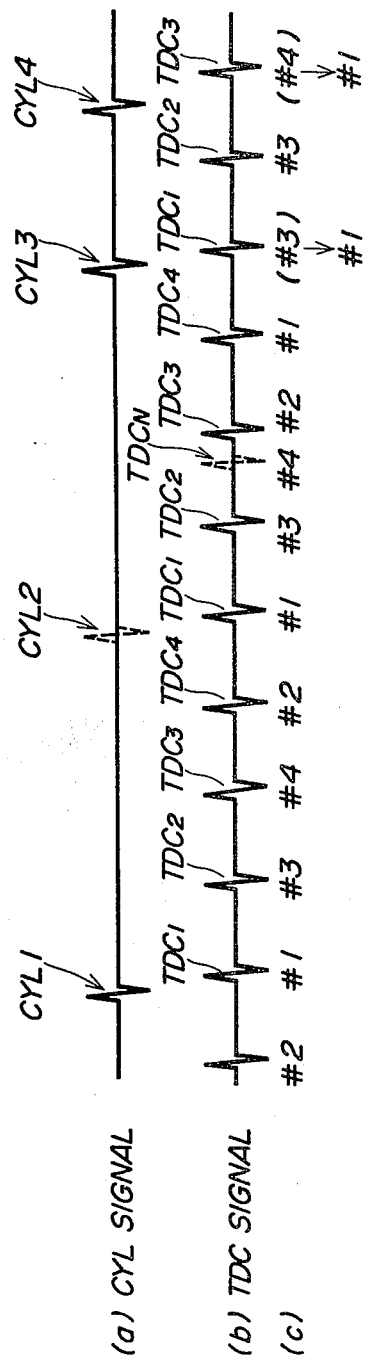
FIG. 3 is a timing chart showing a manner of changing the sequence of fuel injections into the engine cylinders in response to pulses from the cylinder-discriminating means (CYL sensor)

FIG. 3 shows in the form of a timing chart the relationship between generation of pulses from the TDC sensor 5 and the CYL sensor 6 and the fuel injections into the cylinders of the engine. While the TDC sensor 5 and the CYL sensor 6 are normally operating, a fuel injection into a cylinder #1 of the engine takes place in synchronism with a first pulse TDC1 of a crank angle position signal (hereinafter called "the TDC signal") from the TDC sensor 5 shown in (b) in FIG. 3, generated immediately after generation of a pulse CYL1 of a cylinder-discriminating signal (hereinafter called "the CYL signal") from the CYL sensor 6 shown in (a) in FIG. 3, followed by fuel injections into the cylinders #3, #4, and #2, respectively, in synchronism with TDC signal pulses TDC2, TDC3 and TDC4 successively generated subsequently to the pulse TDC1. Thereafter, the same injecting operation is repeated in the above sequence, as shown in (b) and (c) in FIG. 3.

Even if the next pulse CYL2 of the CYL signal is not generated immediately after generation of the last pulse TDC4 of the TDC signal during the above cycle of the engine due to occurrence of a fault in the CYL sensor 6, fuel is injected into the right cylinder #1 upon generation of the next pulse TDC1 immediately following the pulse TDC4. If a noise TDCN is generated between a pulse TDC2 of the TDC signal and a pulse TDC3 of same as indicated by the broken line in (b) in FIG. 3 and fuel is injected into the cylinder #4 upon generation of the noise TDCN, the sequence of fuel injection is advanced so that fuel is successively injected into the cylinders #2, #1, respectively, in synchronism with generation of the subsequent TDC pulses TDC3, TDC4. Then, during the next cycle of the engine, fuel is not injected into the cylinder #3 but it is injected into the cylinder #1 immediately after generation of a pulse TDC1 immediately following the generation of a pulse CYL3 of the CYL signal, to thus change or correct the sequence of fuel injections, followed by fuel injection into the cylinder #3 upon generation of the next pulse TDC2 of the TDC signal. However, if there occurs irregular generation of pulses of the CYL signal due to occurrence of a fault in the CYL sensor 6, for instance, if a pulse CYL4 of the CYL signal is generated before the above next cycle of the engine is not completed, fuel is injected into the cylinder #1 upon generation of a pulse TDC3 immediately following the above pulse CYL4 of the CYL signal, though the cylinder #4 should be supplied with fuel at such instant.

If there occur frequent corrections of the sequence of fuel injections due to malfunction of the CYL sensor as stated above, the undesirable phenomenon can take place that some cylinders are supplied with fuel twice as much as a required fuel quantity during a single cycle of the engine, whereas some other cylinders are not supplied with fuel at all during the same cycle of the engine, thereby impeding smooth operation of the engine and deteriorating the driveability of the engine.

Figure 4:
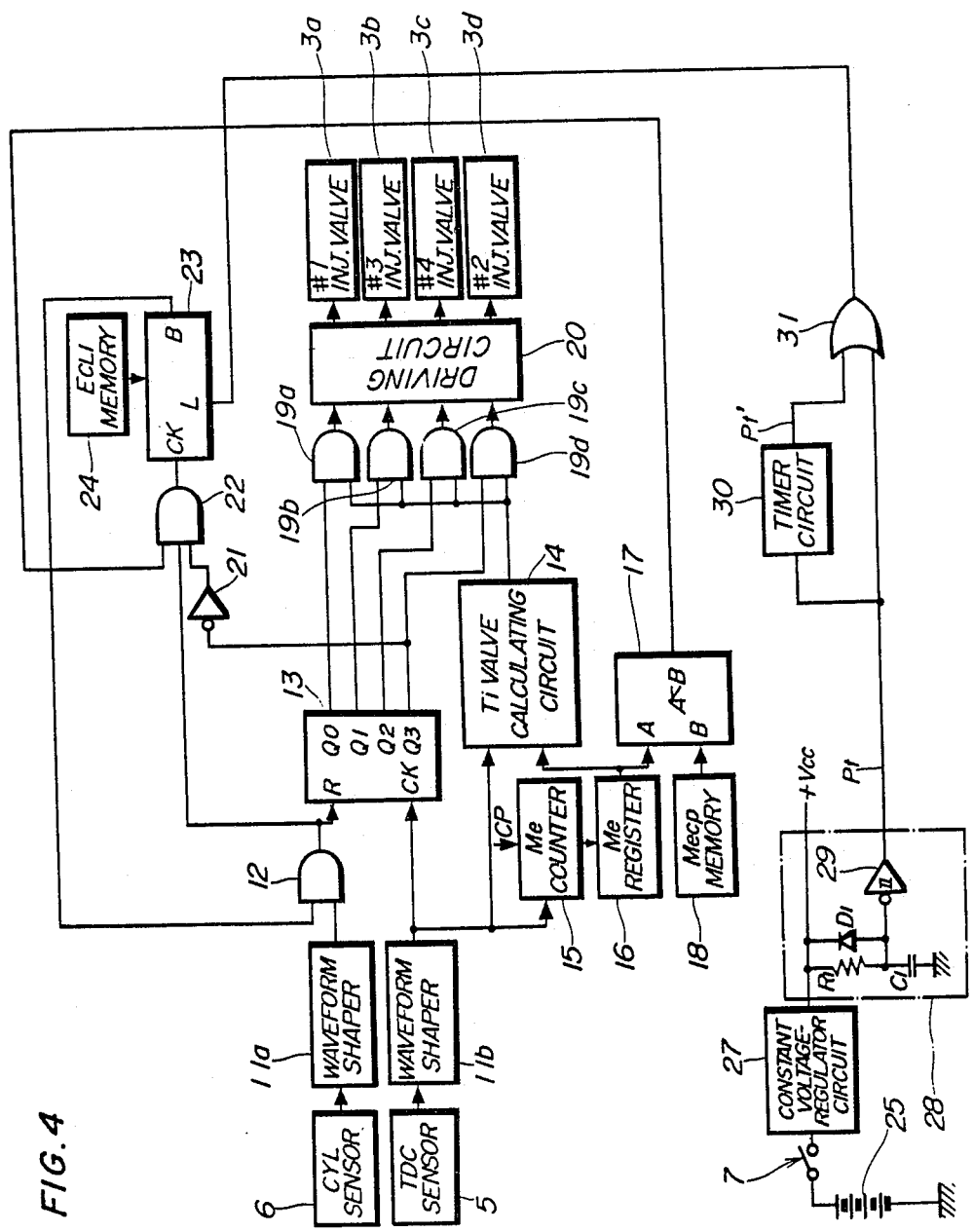
FIG. 4 is a circuit diagram of the internal arrangement of an electronic control unit (ECU) appearing in FIG. 1.

FIG. 4 shows a circuit configuration within the ECU 4 in FIG. 1. The CYL signal generated from the CYL sensor 6 in FIG. 1 has its pulses subjected to waveform shaping into pulses having a rectangular waveform by a waveform shaper 11a, and then applied to an AND circuit 12. The TDC signal generated from the TDC sensor 5 in FIG. 1 has its pulses subjected to waveform shaping into pulses having a rectangular waveform by a waveform shaper 11b, and then applied to a ring counter 13 at its clock input terminal CK, a Ti value calculating circuit 14 which determines the fuel injection period Ti, and an Me value counter 15. The AND circuit 12 is also supplied with an output signal from a presettable down counter 23 through its output terminal B, and an output from the AND circuit 12 is applied to the ring counter 13 at its reset pulse input terminal R as well as to an AND circuit 22. The ring counter 13 has four output terminals Q0-Q3, outputs through which successively turn into a high level (hereinafter merely called "1") each time a pulse of the TDC signal is applied to the clock input terminal CK of the same counter 13. The ring counter 13 is reset each time a pulse of the CYL signal is applied to its reset pulse input terminal R, to generate an output of 1 through its output terminal Q0. The outputs through the output terminals Q0-Q3 of the ring counter 13 are applied, respectively, to AND circuits 19a-19d.

The Me value counter 15 counts the number of clock pulses CP having a predetermined pulse repetition period, generated from a reference clock generator, not shown, between adjacent pulses of the TDC signal successively supplied to the Me value counter 15 from the waveform shaper 11b. Therefore, a count Me from the Me value counter 15 corresponds to the time interval between adjacent pulses of the TDC signal, that is, it is proportional to the reciprocal of the rotational speed Ne of the engine (1/Ne). An Me value register 16 is loaded with a count Me from the Me value counter 15 in synchronism with inputting of timing pulses thereto, and the loaded Me value is applied to the Ti value calculating circuit 14 as well as to a comparator 17.

The Ti value calculating circuit 14 operates on a signal indicative of the rotational speed Ne of the engine supplied from the Me value register 16 to calculate the fuel injection period (fuel quantity) Ti and supplies control pulses having a pulse duration corresponding to the calculated fuel injection period Ti to the AND circuits 19a-19d in synchronism with pulses of the TDC signal supplied from the waveform shaper 11b. These AND circuits 19a-19d transfer the control pulses supplied from the Ti value calculating circuit 14 to a driving circuit 20 as long as they are energized with pulses from the ring counter 13 which are successively applied to the AND circuits 19a-19d one after another.

The driving circuit 20 supplies driving pulses in a successive manner to respective fuel injection valves 3a-3d to energize same one after another, as long as it is supplied with successive control pulses from the AND circuits 19a-19d.

The comparator 17 determines whether or not the engine rotational speed Ne exceeds a predetermined low speed Ncp, e.g. 80 rpm. To be concrete, it compares a value Mecp indicative of the reciprocal of the predetermined engine rotational speed Ncp, supplied at its one input terminal B from an Mecp value memory 18 with a value Me corresponding to the actual engine rotational speed Ne supplied at its other input terminal A, and when the relationship Me < Mecp, i.e. Ne > Ncp stands, it generates an output of 1, which is applied to the aforementioned AND circuit 22.

On the other hand, a constant voltage-regulator circuit 27 is arranged for connection with a battery 25 upon turning-on or closing of the ignition switch 7 to generate a predetermined level of voltage Vcc. A trigger pulse generator circuit 28 is comprised of a resistance R1 and a capacitor C1 serially connected, a diode D1 connected in parallel with the resistance R1, and a Schmitt trigger circuit 29 with its input connected to the junction of the resistance R1 with the capacitor C1. Upon being supplied with the regulated output voltage Vcc from the constant voltage-regulator circuit 27, that is, when the ignition switch 7 is turned on, the trigger pulse generator circuit 28 generates a trigger pulse Pt and applies same to the down counter 23 at its input terminal L by way of an OR circuit 31.

A timer circuit 30 is connected in parallel between the trigger pulse generator circuit 28 and the OR circuit 31, which is adapted to be actuated by a trigger pulse Pt generated from the circuit 28 upon closing of the ignition switch 17, to generate a reset pulse Pt' at a predetermined time interval, e.g. 10 minutes.

The down counter 23 is loaded with data indicative of a predetermined number of times of abnormality detections, e.g. 10, from an ECL1 value memory 24, when it is supplied with the trigger pulse Pt or Pt'. The output from the AND circuit 22 is applied to the clock input terminal CK of the down counter 23. The AND circuit 22 is energized when the output from the comparator 17 assumes a value of 1, that is, the relationship Ne > Ncp stands, and at the same time the output at the output terminal Q3 of the ring counter 13 has a low level, that is, any one of the fuel injection valves 3a,3b and 3c for the cylinders #1, #3 and #4 other than the cylinder #2 is in an energized state. The energized AND circuit 22 transfers pulses of the CYL signal supplied thereto, to the down counter 23. That is, in the event that while fuel is injected into the cylinders in the order of #1, #3, #4 and #2 as shown in FIG. 3, a pulse of the CYL signal is generated between the time of generation of a first pulse TDC1 of the TDC signal and the time of generation of a fourth pulse TDC4 thereof during the same cycle of the engine, correction of the sequence of fuel injections is effected. To be concrete, when a pulse of the CYL signal is supplied to the ring counter 13 through the AND circuit 12 while the output through the output terminal Q3 of the ring counter 13 is at a low level and any one of the outputs through the other output terminals Q0-Q2 is at a high level, the down counter 23 is actuated by the above pulse of the CYL signal to have its count reduced by 1 and at the same time the ring counter 13 is reset by the same CYL signal pulse to generate a high output of 1 through its output terminal Q0 for injection of fuel into the fuel injection valve 13a of the cylinder #1.

An initial value or preset value ECL1 of the count E in the down counter 23 is reduced by 1 each time a pulse of the CYL signal is applied to the counter 23 through the AND circuit 23 while the latter is in an energized state. The count E is reduced to 0 if it is reduced by 1 ten times before the lapse of a predetermined period of time (10 minutes). The output through the output terminal $\overline{B}$ of the down counter 23 assumes a high level of 1 when the count E in the down counter 23 is other than 0, and assumes a low level of 0 when the count E is 0. Thus, when the output from the down counter 23 goes low, that is, when the number of times of corrections of the sequence of fuel injections caused by irregular pulses of the CYL signal reaches 10, the AND circuit 12 is deenergized under the assumption that the cylinder-discriminating means is in an abnormal condition. As long as this assumption holds, the ring counter 13 is prevented from being reset by pulses of the CYL signal subsequently generated, and the sequence of outputting through the output terminals of the ring counter 13 is determined by the generation of pulses of the TDC signal alone.

If the predetermined period of time (10 minutes) elapses before the number of times of corrections of the sequence of fuel injections reaches 10, the timer circuit 30 generates a reset pulse Pt' upon the lapse of the same predetermined period of time, which pulse causes resetting the count N in the down counter 23 to the preset value ECL1. Reversely, unless the number of times of corrections of the sequence of fuel injections reaches 10 before the lapse of the predetermined period (10 minutes), the cylinder-discriminating means will never be regarded as abnormal.

Figure 5:
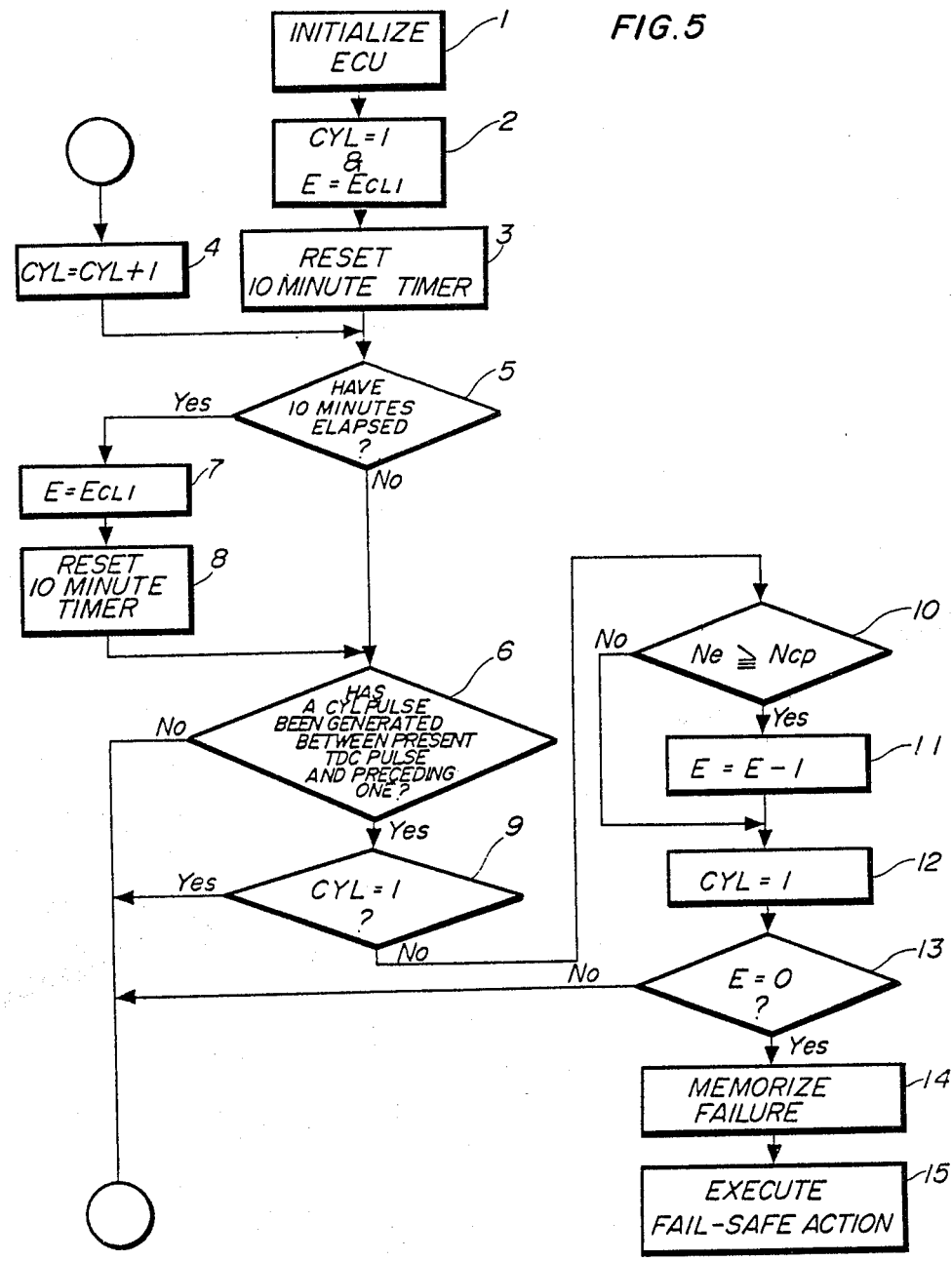
FIG. 5 is a flow chart of a manner of determining an abnormality in the cylinder-discriminating means, according to the method of the invention.

FIG. 5 shows a flow chart of a manner of determining an abnormality in the cylinder-discriminating means according to the method of the invention. The ECU 4 is initialized upon closing of the ingition switch 7 in FIG. 1, at the step 1. Then, a count CYL for discrimination of a particular cylinder of the engine is reset to an initial value of 1, and at the same time the count E in the down counter 23 in FIG. 4 is set to the predetermined value ECL1 (10), at the step 2. The above count CYL indicates a cylinder to be supplied with injected fuel such that when the count CYL assumes a value of 1, fuel is to be injected into the cylinder #1, for instance immediately after generation of a pulse of the CYL signal. After this, the timer circuit 30 is started to generate pulses for presetting the count E in the down counter 23 to the predetermined value ECL1 every ten minutes, at the step 3. The steps 1 through 3 are each executed only one time at the time of closing of the ignition switch 7, and after execution of each of these steps, the step 4 et seq. are executed in synchronism with generation of pulses of the TDC signal. The cylinder-discriminating count CYL is increased by 1 each time a pulse of the TDC signal is generated, at the step 4. When the count CYL reaches a value equal to the sum of the number of cylinders and 1 (e.g. 5), the count CYL is automatically reset to 1. Then, it is determined at the step 5 whether or not 10 minutes have elapsed, by means of the 10 minute timer circuit 30. If the answer to the question of the step 5 is affirmative, the count E in the down counter 23 is again set to the value ECL1, at the step 7, and at the same time the timer circuit 30 is reset to start again, at the step 8, followed by execution of the step 6. In the step 6, a determination is made as to whether or not a pulse of the CYL signal has been generated between the present pulse of the TDC signal and the preceding pulse thereof, and if no pulse of the CYL signal has then been generated, execution of the present program is terminated.

On the contrary, if generation of a pulse of the CYL signal has been determined at the step 6, it is then determined whether or not the cylinder-discriminating count CYL is equal to 1, at the step 9. If the answer is yes, it is determined that the proper cylinder to be supplied with fuel during the present loop of execution of the program is the cylinder #1 corresponding to the count CYL of 1, that is, fuel injection into the cylinders is now being carried out in the proper sequence. This means that no abnormality occurs in the CYL sensor 6, thereby terminating execution of the present program.

If the answer to the question of the step 9 is negative, that is, if it is determined that the actual cylinder to be supplied with fuel immediately after generation of the pulse of the CYL signal is other than the proper cylinder #1, the program proceeds to the step 10 wherein it is determined whether or not the rotational speed Ne of the engine is larger than the aforementioned predetermined value Ncp (80 rpm). When the rotational speed of the engine is lower than the predetermined value Ncp, the TDC sensor 5 and the CYL sensor in FIG. 2, which are formed of electromagnetic pickups, cannot be excited by the salient poles 10a, 10b of the magnetic discs to such a sufficient extent as to ensure positive generation of pulses of the CYL signal. Therefore, if the answer to the question of the step 10 is negative, the program jumps to the step 12 to reset the count CYL to 1, without executing the correction of the fuel injection sequence.

If the answer to the question of the step 10 is affirmative, correction of the fuel injection sequence is executed by reducing the count E in the down counter 23 by 1 at the step 11 and again setting the cylinder-discriminating count CYL to 1 at the step 12 so that fuel is injected into the proper cylinder #1 immediately after the generation of the pulse of the CYL signal determined at the step 6.

Then, the program proceeds to the step 13 to determine whether or not the count E in the down counter 23 is zero. If the count E, which is reduced by 1 each time at the step 11, is reduced to zero before it is determined that the predetermined period of time (10 minutes) has elapsed at the step 5, it is judged that there is a failure in the CYL sensor 6, and this failure is memorized in a storage means at the step 14, and at the same time a fail safe function, hereinafter explained, is performed at the step 15. If the answer to the question of the step 13 is negative, it is judged that the CYL sensor is in a normally operative state, and accordingly execution of the present program is terminated.

The fail safe action in the step 15 is performed in the following manner: The AND circuit 12 in FIG. 4 is closed to prohibit resetting of the ring counter 13 responsive to the CYL signal but allow only resetting of same responsive to the TDC signal so that the outputs through the output terminals Q0–Q3 of the ring counter 13 become 1 one after another in the order of Q0, Q1, Q2 and Q3 in response to pulses of the TDC signal successively applied to the ring counter 13 and the output through the output terminal Q0 becomes 1 upon application of the next pulse of the TDC signal to the ring counter 13. In this way, when the cylinder-discriminating means is determined to be abnormal, the sequence of fuel injections is determined by generation of pulses of the TDC signal in lieu of pulses of the CYL signal, and the engine cylinders are each supplied with a batch of injected fuel during each cycle of the engine, though the injection timing can be slightly deviated from optimum timing, thereby at least ensuring continuation of the operation of the engine.

Although in the foregoing embodiment fuel is injected into individual ones of the engine cylinders successively in predetermined sequence in synchronism with generation of a crank angle position signal such as the TDC signal, the method of the invention is not limited to such fuel injection method, but it may of course be applied to a so-called double-cylinder injecting method of dividing the cylinders into groups, e.g. a group of cylinders #1 and #4, and a group of cylinders #3 and #2, and injecting fuel successively into each of the groups each time a pulse of the TDC signal is generated.

Further, although in the illustrated embodiment shown in FIGS. 3 and 4, the count E of the down counter 23 is set to the preset value ECL1 each time a pulse is generated by the timer circuit 30 at an interval of a predetermined period of time (e.g. 10 minutes), such timer circuit 30 may be omitted. If the timer circuit 30 is omitted, it may be judged that the cylinder-discriminating means is abnormal when the number of corrections of the fuel injection sequence reaches the predetermined value ECL1 before the ignition switch 7 is again opened after it has once been closed.

What is claimed is:

1. A method for controlling the injection of fuel into an internal combustion engine having a plurality of cylinders, pistons disposed within respective ones of said cylinders, a crankshaft to which said pistons are connected, crank angle position-detecting means for detecting predetermined positions of said pistons within said respective ones of said cylinders and generating pulses as a first signal indicative of detected predetermined positions of said pistons, and cylinder-discriminating means adapted to generate a pulse as a second signal each time said crankshaft of said engine rotates through a predetermined angle with respect to a predetermined position of one of said pistons within a particular one of said cylinders, wherein fuel is injected into said cylinders in predetermined sequence starting from a fuel injection into said particular one of said cylinders, in synchronism with pulses successively generated from said crank angle position-detecting means immediately after generation of each pulse of said cylinder-discriminating means, the sequence of fuel injections into said cylinders being changed so as to first effect fuel injection into said particular one of said cylinders immediately after generation of a pulse of said second signal and thereafter effect fuel injections into the other cylinders in said predetermined sequence when one of said cylinders which corresponds to a first pulse of said first signal is other than said particular one of said cylinders immediately after generation of said pulse of said second signal, the method comprising the steps of: (1) counting the number of times of said changing of the sequence of fuel injections and comparing the counted number with a predetermined number; (2) regarding said cylinder-discriminating means as abnormal when the counted number reaches the predetermined number; and (3) effecting fuel injections into said cylinders in said predetermined sequence in synchronism with pulses of said first signal alone, irrespective of generation of subsequent pulses of said second signal, when said cylinder-discriminating means is regarded as abnormal in said step (2).

2. A method as claimed in claim 1, wherein fuel is injected into said cylinders one after another in said predetermined sequence starting from a fuel injection into said particular one of said cylinders, in synchronism with pulses of said first signal successively generated from said crank angle position-detecting means.

3. A method as claimed in claim 1, wherein said cylinders are divided into a plurality of groups, and fuel is successively injected into individual ones of said groups of said cylinders one after another in predetermined sequence starting from a fuel injection into one of said groups which includes said particular one of said cylinders, in synchronism with generation of said first signal.

4. A method as claimed in claim 1, wherein said engine has an ignition switch, said counting of the number of times of said changing of the sequence of fuel injections in said step (2) being started from the time of closing of said ignition switch, and said step (3) comprising regarding said cylinder-discriminating means as abnormal when the counted number obtained in said step (1) reaches said predetermined number within a period of time from closing of said ignition switch to subsequent opening thereof.

5. A method as claimed in claim 1, wherein said step (3) comprises regarding said cylinder-discriminating means as abnormal when the counted number obtained in said step (1) reaches said predetermined number within a predetermined period of time.

6. A method as claimed in claim 1, wherein said counting of the number of times of said changing of the sequence of fuel injections in said step (1) is effected only when the rotational speed of said engine exceeds a predetermined value.

* * * * *